Jan. 11, 1949.　　　　A. F. HOWE　　　　2,458,706
DIFFERENTIAL GEARING FOR CENTRIFUGAL MACHINES
Filed May 14, 1945　　　　　　　　　　　3 Sheets-Sheet 2
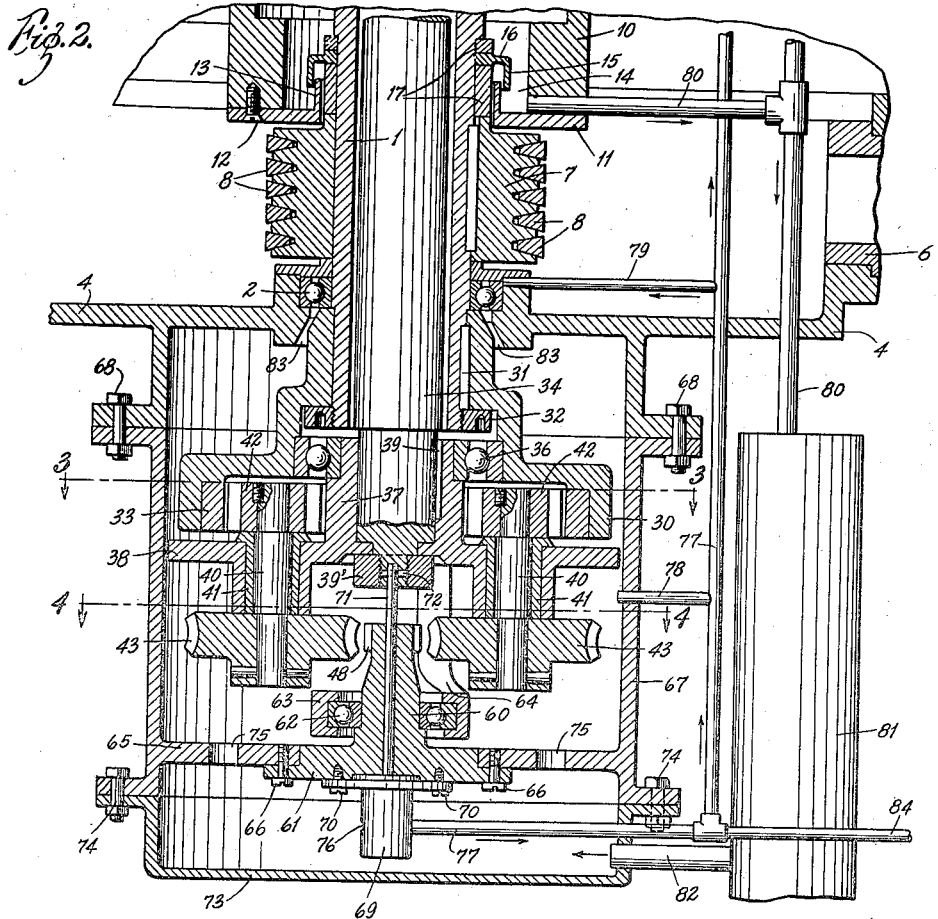
INVENTOR:
ANDREW F. HOWE,
By John D. Rippey
HIS ATTORNEY Jan. 11, 1949. A. F. HOWE 2,458,706
DIFFERENTIAL GEARING FOR CENTRIFUGAL MACHINES
Filed May 14, 1945 3 Sheets-Sheet 3
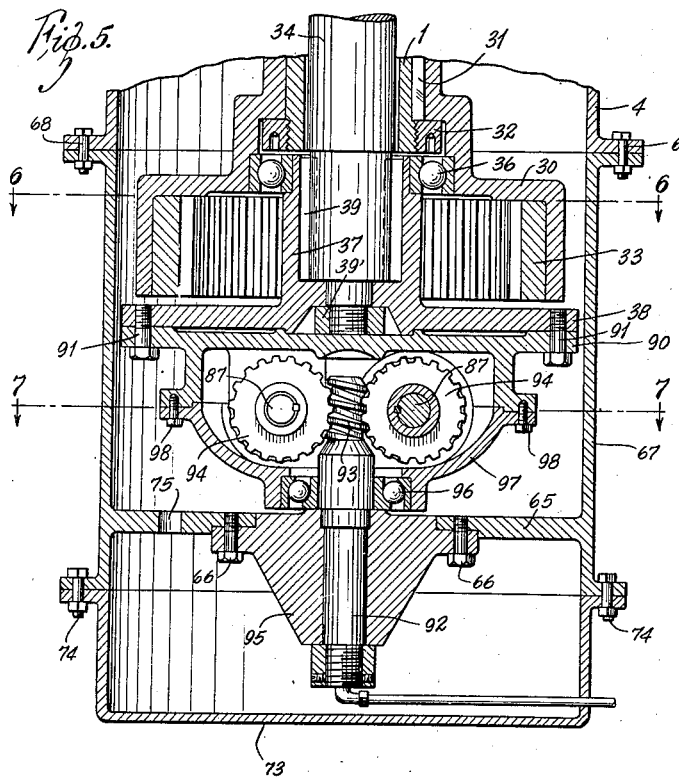
INVENTOR:
ANDREW F. HOWE,
By John D. Rippey
HIS ATTORNEY.

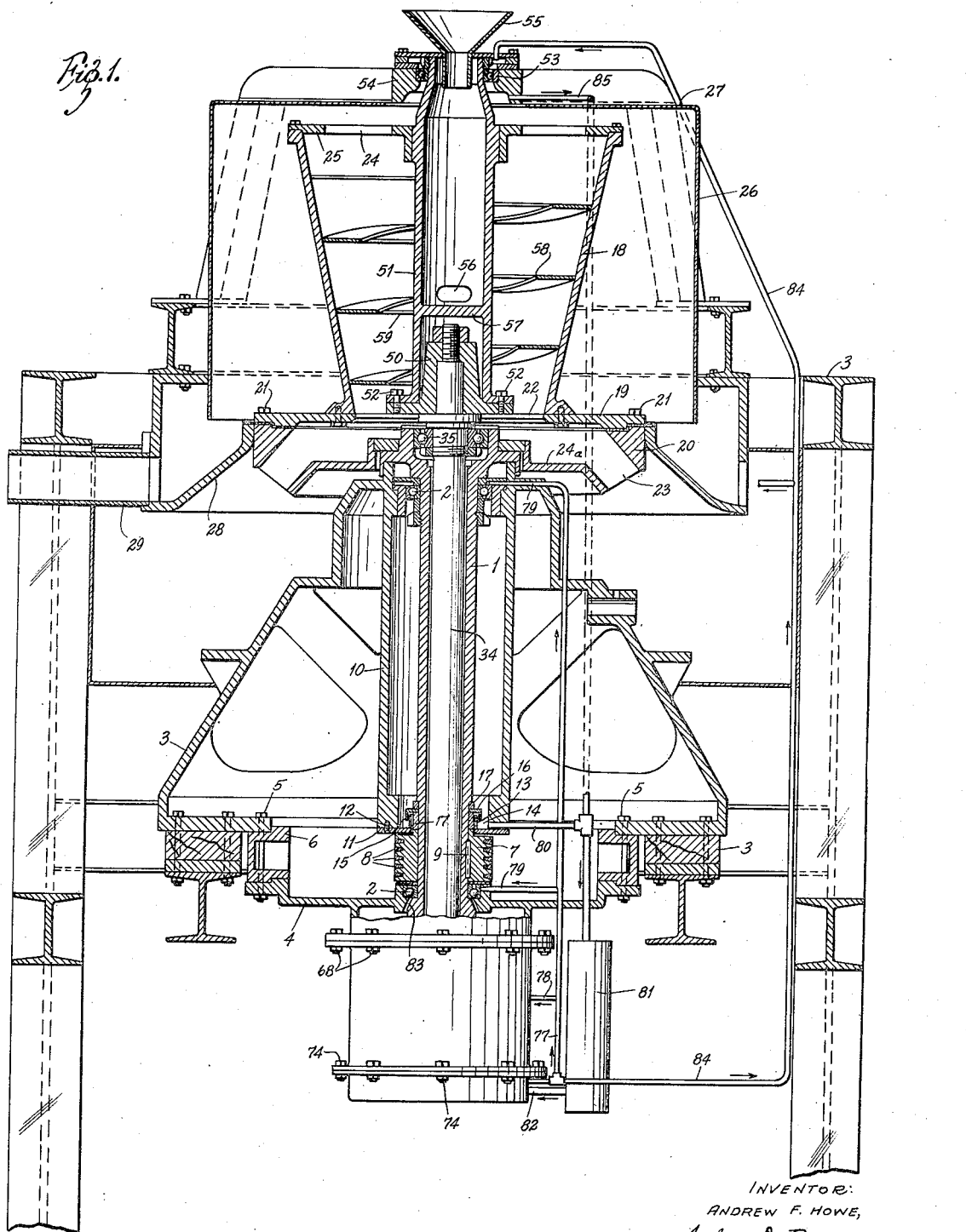

Patented Jan. 11, 1949

2,458,706

UNITED STATES PATENT OFFICE 2,458,706

DIFFERENTIAL GEARING FOR CENTRIFUGAL MACHINES

Andrew F. Howe, St. Louis, Mo., assignor, by mesne assignments, to Centrifugal & Mechanical Industries, Inc., St. Louis, Mo., a corporation of Missouri Application May 14, 1945, Serial No. 593,595

7 Claims. (Cl. 74—280)

This invention relates generally to a differential gearing for centrifugal machines; and it has special reference to gearing for driving the inner mechanism of centrifugal machines or centrifugal clarifiers differentially, or at a different speed, from the outer mechanism, such as a basket, screen, or solid bowl.

This improved differential gearing is specially designed for use in centrifugal clarifiers and separators such as those disclosed in my prior Patents No. 2,043,662 and No. 2,043,663, both June 9, 1936, and No. 2,218,532, October 22, 1940.

Said patents disclose rotative outer bowls or screens for receiving the materials to be separated or clarified, and inner rotative devices enclosed within the rotative bowls or screens for rotation differentially from, and at selected lower speeds than, the speeds of rotation of the outer bowls or screens. The bowls or screens are mounted for rotation by vertical tubular shafts while the inner mechanisms are rotative by rotary shafts extending concentrically within the tubular shafts. The present invention has special reference to mechanism for differentially rotating one of said shafts by the other. It may also provide for selectively changing the differential of rotation.

An object of the present invention is to provide a differential mechanism for use in machines of the type mentioned, comprising a tubular driven shaft for rotating the outer bowl or screen, an inner shaft for rotating the inner mechanism and mounted concentrically within the tubular shaft, a stationary gear element in axial alinement with said inner shaft, a gear member supported and rotated by said driven shaft, gearing supported by said inner shaft and engaged by said gear member for rotating the inner shaft, and means engaging said stationary gear element for controlling said gearing to impart a differential speed of rotation to said inner shaft slower or faster than and differentially from said driven shaft while said gearing is moved in a planetary orbit around said stationary gear element.

Another object of the invention is to provide a differential gearing for rotating an inner shaft differentially from a driven tubular shaft through which said inner shaft extends concentrically, comprising an internal gear supported and rotated by the driven tubular shaft, a series of gears supported by the inner shaft and moved by said internal gear along a planetary orbit during rotation of said driven tubular shaft while said series of gears remain otherwise unrotated by said internal gear, a rigid and stationary gear element supported in axial alinement with or concentrically with the axis of said inner shaft, and mechanism engaging said gears and said gear element for controlling the speed of rotation of said inner shaft differentially with respect to said driven tubular shaft when the latter is rotated.

Another object of the invention is to provide an improved differential gearing for rotating one shaft by a drive shaft, comprising a gear rotated by said drive shaft, planetary gearing supported by said one shaft and moved in a planetary path about the axis of said one shaft by which said gearing is supported, in combination with a rigid gear element connected with said gearing and imparting rotary movement thereto relative to said gear and thereby imparting a differential rotation to said one shaft relative to said drive shaft when said drive shaft is positively rotated.

Another object of the invention is to provide improved means for supporting gearing in connection with a shaft for rotating said shaft differentially with respect to the speed of rotation of the drive shaft, in combination with a rigid gear element for preventing axial rotation of said gearing by said drive shaft and for controlling rotation of said gearing to rotate said first named shaft differentially with respect to said drive shaft, and facilitating interchange of one gearing for another to vary the differential between the speeds of rotation of said shafts.

Another object of the invention is to provide improved means for enclosing said differential gearing and for detachably supporting said rigid stationary gear element, facilitating dismantling of said differential gearing and detachment of the various parts thereof for purposes of repair or replacement, and also facilitating variation or change of the differential between the speeds of rotation of said shafts.

Another object of the invention is to provide an improved differential gearing for driving the inner mechanism of a centrifugal clarifier or a centrifugal separator by the drive for the outer mechanism of the clarifier or separator which is durable, does not become worn or otherwise damaged by long use, is nearly noiseless and silent in operation, and may be conveniently detached or disassembled for any needed purpose, such as repair, replacement of parts, or variation of differential.

Various other objects will be apparent from the following description, reference being made to the annexed drawings, in which—

Fig. 1 is a vertical sectional view of a centrifugal clarifier having my present invention embodied therein.

Fig. 2 is a vertical sectional view showing an embodiment of my improved differential for centrifugal machines.

Fig. 3 is a horizontal sectional view on the line 3—3 of Fig. 2.

Fig. 4 is a sectional view on the line 4—4 of Fig. 2.

Fig. 5 is a vertical sectional view showing another and, in some instances, a preferred modification of my improved differential gearing, the oil filter device being omitted.

Fig. 6 is a sectional view on the line 6—6 of Fig. 5.

Fig. 7 is a sectional view on the line 7—7 of Fig. 5, showing structural features of the gearing controlling differential rotation of one shaft by a drive shaft, and also removable means supporting said gearing in connection with said shaft that is to be differentially rotated by said drive shaft.

This is a continuation, in part, of my prior application for patent for Differential for centrifugal machines, filed August 23, 1943, Serial No. 499,629, now abandoned.

The machine in which the invention is shown is a centrifugal clarifier having a vertical outer tubular drive shaft I mounted for rotation about a vertical axis in a number of vertically alined anti-friction bearings 2. The number of said bearings may be increased as desired so long as one bearing is provided for the upper end and another bearing for the lower end of said shaft. Other and additional bearings may be provided for said shaft as they are needed. This centrifugal machine or clarifier is mounted in a rigid frame composed of rigid frame elements 3 to one of which a support 4 for the lower bearing 2 is detachably secured by bolts 5 and spacer members 6. In addition to constituting a mounting for the lower bearing 2, the support 4 also sustains the housing or enclosure for the differential mechanism included in the present invention.

Driving mechanism for rotating the outer tubular shaft I may comprise a circumferentially grooved pulley 7 for engagement by complementary V-belts 8. The pulley 7 may be detachably secured to the outer tubular shaft I by a key 9 or otherwise, so that said shaft I will be rotated by said pulley when the latter is rotated by operation of the belts 8. The bearing 2 for the upper end of the outer tubular shaft I may be supported as shown by the same frame element 3 to which the support 4 for the lower bearing 2 is attached by the bolts 5. An enlarged tubular sleeve 10 is formed integral or rigid with the frame member 3 in which the upper bearing 2 is mounted, and extends downwardly around the outer tubular shaft I nearly to the plane of the upper end of the pulley 7. The sleeve 10 is wholly out of contact with the outer tubular shaft I, and leaves said shaft freely rotative in the bearings 2.

An annular wall 11 is detachably secured to the lower end of the sleeve 10 by screws 12 or otherwise, and supports an upwardly extended cylindrical flange 13 which cooperates with the sleeve 10 and the wall 11 to form an annular basin or sump 14 to receive and retain oil that had been delivered and applied to the upper bearing 2 and had passed downwardly therefrom after lubricating said bearing.

A canopy including a downwardly extended annular skirt 15, and an inwardly extended radial flange 16 engaged between clamping rings 17, is attached to the outer tubular shaft I. This canopy functions to prevent oil from passing from the basin or sump 14 through the space within the flange 13. That is, the skirt 15 of the canopy surrounds the upper end of the flange 13 while the radial flange 16 of said canopy is above the flange 13. The canopy is out of contact with the cylindrical flange 13.

In the machine shown, an imperforate or solid bowl 18 in the form of an inverted truncated cone is rigidly attached to an annular plate 19. The plate 19 is rigidly secured to a rotor 20 by detachable screws or fasteners 21. The rotor 20 is of annular form and is rigidly attached to the upper end of the outer tubular shaft I so that the bowl 18 will be rotated by said shaft I. The axis of the bowl 18 is in vertical alinement with the axis of the shaft I. The opening 22 through the plate 19 permits solids to pass downwardly from the bowl 18 into and through outlet passages 23 in the rotor 20 while the liquid is discharged upwardly from the bowl through openings 24 in a bowl lid 25. Because of the fact that the shaft I, rotor 20, plate 19, and solid bowl 18 are attached together, they constitute a unit which is rotated by mechanism comprising the pulley 7 and belts 8. In some instances, this mechanism is rotated at about three thousand revolutions per minute. The bottom wall 24a of the rotor 20 has a central hole through which the upper end portion of the shaft I extends, and is rigidly attached to said shaft by any known attaching means. Otherwise, the bottom wall 24a of the rotor 20 is imperforate and, when rotated at high speed, causes the solids thereon, received from the bowl 18 through the opening 22, to be discharged outwardly through the outlet passages 23 above the conical frame element 3 that supports the bearings 2 for the shaft I.

Liquid from the solid bowl 18 is discharged upwardly through the openings 24 in the bowl lid 25 into a space provided therefor and enclosed by a wall 26 surrounding the bowl 18 and a top wall 27 above said bowl. The liquids are discharged downwardly from the space enclosed by the walls 26 and 27 onto a conical stationary wall 28 attached to the frame 3 of the machine. The liquid is conducted from the wall 28 through one or more outlet passages 29.

A canopy 30 is supported and rotated by the drive shaft I. The canopy 30 is attached to the drive shaft I by a key 31, and may be detachably supported on said shaft by a ring nut 32 screwed on the lower end of the shaft. An internal gear 33 is rigidly secured within and to the lower portion of the canopy 30 concentrically with the extended axis of said shaft I.

The inner shaft 34 is mounted concentrically within the outer tubular shaft I for rotation in an upper bearing 35 supported by the upper end of the shaft I, and in a lower bearing 36 within the canopy 30. The bearings 35 and 36 are located above the upper bearing 2 and below the lower bearing 2, respectively, and support the shafts I and 34 out of contact so that neither of said shafts interferes with the free rotation of the other, frictionally or otherwise, leaving the inner shaft 34 free for control by the differential mechanism provided for that purpose.

The gear support for a part of said differential mechanism comprises a hub 37 and a radially extended web plate 38. The hub 37 is mounted on the shaft 34 and is attached thereto by a key 39 for controlling the rotation of said shaft 34 differentially from the rotation of the shaft 1 by gearing provided for that purpose. A reduced portion of the shaft 34 extends through the web plate 38 and is engaged by a removable and replaceable nut 39' which holds the gear support 37—38 on the shaft 34 and prevents relative displacement of said parts. When the nut 39' is removed, the unit comprising the gear support 37—38 and the parts carried thereby including the bearing 36, may be detached from the shaft 34.

Two stud shafts 40 are rotatively journalled in bearings 41 carried by the web plate 38. The stud shafts 40 are paralled with each other and with the axes of the shafts 1 and 34 and, in the arrangement shown, are diametrically opposite from each other. Pinions 42 are attached to the upper ends of the stud shafts 40 and mesh with diametrically opposite portions of the internal gear 33. I have found that a satisfactory operation is obtained by providing fifty-two teeth within the internal gear 33 and twelve teeth on each pinion 42.

A controlling spiral gear 43 is attached to the lower end of each stud shaft 40; and, in the satisfactory mechanism provided, each spiral gear 43 may be formed with thirty teeth extending upwardly and downwardly at uniform angles less than 30° from the planes of the axes of the shafts 40 to said respective teeth. That is, the spiral teeth on the gears 43 incline less than 30° from vertical planes. The spiral gears 43 engage with complementary spiral worms 44 attached to two horizontal stud shafts 45. The two stud shafts 45 extend in parallel planes and, in the modification shown in Figs. 2 and 4, are rotatively journalled in bearings 46 mounted in arms 47 extending downwardly from integral connection with the web plate 38. The worms 44 extend spirally around the shafts 45 at an angle of inclination less than 30° from the radii or diameters of said shafts in order to engage the spiral gears 43 smoothly and complementarily. Because of the fact that the angles of inclination of the teeth of the spiral gears 43 are less than 30° from parallelism with the axes of said gears and of the shafts 40, and because of the fact that the angles of inclination of the worms 44 are less than 30° from the radii or diameters of the shafts 45 and are complementary to the angles of inclination of the teeth of the spiral gears 43, a controllable lock is provided that prevents rotation of the stud shafts 40, the pinions 42, and the spiral gears 43 about their own axes by the internal gear 33. That is, the gearing comprising the internal gear 33, pinions 42, stud shafts 40, spiral gears 43, worms 44, and shafts 45, provides a controllable lock that will rotate the inner shaft 34 by the shaft 1 and at the same speed or revolutions per minute while the gearings 40—42—43 remain unrotated by said gear 33.

An immovable spiral gear element 48 is midway between and out of engagement with the spiral gear wheels 43, and is between and engaged by two spiral gear wheels 49 that are attached to and supported by the shafts 45. The spiral gear element 48 is in axial alinement with the shaft 34. The angles of inclination of the spiral gear teeth on the element 48 and on the wheels 49 from the planes of the axes of said gear element and of said gear wheels, respectively, are symmetrical and are such as to impart a rotary movement to the shafts 45 about their respective axes during planetary movement of the gear wheels 43, as described. This rotation of the shafts 45 imparts rotary movements to the stud shafts 40 through the worms 44 and the spiral gears 43, thereby rotating the pinions 42 with respect to the internal gear 33. This causes a differential rotation of the shaft 34 with respect to the outer tubular shaft 1. Each of the gear wheels 49 may be provided with twenty teeth, and the immovable spiral gear element 48 may be provided with twelve teeth complementarily to the spiral gear wheels 43 and the pinions 42, respectively. This will impart a differential rotary movement to the shaft 34 in comparison with the rotary movement of the outer tubular shaft 1 of about 2988 revolutions per minute for the shaft 34 and 3000 revolutions per minute for the shaft 1. Both shafts will rotate in the same direction.

In the centrifugal machine shown, the shaft 34 extends upwardly beyond the upper end of the outer tubular shaft 1 and into the lower end portion of the solid bowl 18. A coupling 50 (Fig. 1) is detachably secured to the upper end of the shaft 34 within the lower end of the bowl 18 and supports an inner cylinder or cone 51. The cylinder or cone 51 is detachably secured to the coupling member 50 by removable screws 52. The cylinder or cone 51 is coaxial with and is of much less diameter than the bowl 18 so as to provide a space to receive the mixture of liquids and solids to be processed by the machine. The upper end of the cylinder or cone 51 projects axially through the bowl lid 25 and is rotative within a bearing 53 mounted in a frame part 54 rigid on the frame 3. The mixture of liquids and solids to be processed may be delivered into the cylinder or cone 51 through a hopper 55 supported by the frame 54. The cylinder or cone 51 has a number of outlet openings 56 immediately above an imperforate lower end wall 57 in said cylinder or cone above the coupling 50. The mixture of liquids and solids may pass through the openings 56 to the outside of the cylinder or cone 51 and within the bowl 18. A spiral flight 58 is supported and operated by the cylinder or cone 51 by arms 59. The edge of the flight 58 is adjacent to the inner surface of the bowl and, in the present embodiment of the invention, moves at a slightly less speed than the speed of rotation of said bowl by the gearing above described. However, the relative revolutions per minute of the bowl 18 and the flight 58 may be modified or reversed without departure from the invention. The inner edge of the flight 58 is spaced outwardly from the cylinder or cone 51 to permit upward passage of the liquid for ultimate discharge through the openings 24, while the solids are conducted downwardly by the flight 58 and discharged through the opening 22 and outlet passages 23. Considering that the rotation of the bowl 18 and of the cylinder or cone 51 is in a counter-clockwise direction, I have arranged the flight 58 to incline upwardly in the opposite direction. With the differential between the speed of rotation of the outer bowl 18 as compared with the speed of rotation of the inner cylinder or cone 51 and the flight 58, the liquid discharged through the openings 24 after having been processed, is clarified and separated from solids to a greater degree of purity or clarity than is attained by other machines with which I am familiar.

The spiral gear element 48 is rigid on a stud 60 projecting upwardly in axial alinement with the shaft 34 from rigid connection with a support 61. An anti-friction bearing 62 is mounted on the stud 60 within a ring 63 supported by a downward projection 64 integral with the web 38 of the differential gear support 37—38. Thus, the bearing 62 and the stud 60 cooperate directly with the bearings 35 and 36 for the inner shaft 34 to prevent oscillation of said shaft during rotation thereof, to facilitate such rotation, and to eliminate noise. The support 61 is detachably and rigidly secured to the bottom wall 65 by removable and replaceable fasteners 66. The bottom housing wall 65 is rigidly suuported within a housing 67 which encloses the differential gear and is detachably secured to the support 4 by removable and replaceable fasteners 68 and cooperates with said support 4 and with the support 61 to form a housing completely enclosing the differential gearing or differential mechanism for rotating the inner shaft 34 differentially with respect to the outer tubular shaft 1 when the latter is rotated.

An oil pump mechanism of any preferred and known construction may be provided for forcing lubricating oil to the different bearings and parts requiring lubrication. Such an oil pump is shown conventionally, and is indicated by the reference numeral 69 attached to the support 61 by removable and replaceable fasteners 70. A shaft 71 for rotating or operating the pump 69 extends from said pump axially through the stud 60 and axially into a hole in the lower end of the shaft 34. A separable coupling is provided for rotating the shaft 71 by the shaft 34, in order to operate the pump mechanism 69 when the shafts 1 and 34 are operating. Said coupling may consist of a pin 72 extending diametrically through the lower end of the shaft 34 and engaging in a complementary notch in the upper end of the shaft 71. The pump mechanism 69 is enclosed within a reservoir 73 detachably secured to the lower end of the housing 67 by removable and replaceable fasteners 74. This reservoir functions to receive and contain liquid passing or draining from the housing 67 through ports 75.

Oil is admitted into the pump mechanism 69 through an inlet port 76, and is discharged from said pump mechanism through a tube conduit 77. The tube conduit 77 has a branch tube 78 opening into the housing 67 in a plane above the spiral gear wheels 43, so that oil injected into said housing through the branch tube 78 will be discharged as a jet onto said spiral gears 43 and other parts associated therewith during operation of said gearing. The tube conduit 77 also has jet branches 79 opening adjacent to the respective bearings 2 for discharging jets of oil onto said bearings, leaving the oil flowing downwardly from the upper bearing 2 free to pass into the annular basin or sump 14, from which the oil flows through a tube conduit 80 into and through a filter 81, and thence through a tube conduit 82 into the reservoir 73 for reuse, and reapplication to the operating parts of the machine by the pump mechanism 69. The oil from the lower bearing 2 may pass through ports 83 into the housing 67 for lubricating the differential gear mechanism contained in said housing, after which said oil may pass through the ports 75 into the reservoir 73 for reuse, and reapplication by the pump mechanism 69. Oil may be applied to the bearing 53 (Fig. 1) through a tube conduit 84 branching from the tube conduit 77, and reconducted from said bearing 53 through a tube conduit 85 opening into the tube conduit 80.

The modification shown in Figs. 5, 6 and 7 comprises improved means for supporting gearing to rotate the shaft 34 differentially with respect to the speed of rotation of the drive shaft 1, and to facilitate interchange, removal and replacement of parts. The said drive shaft 1 and the said shaft 34 are supported for differential rotation, such as by the devices already described. The drive shaft 1 is rotated at high speed by driving connections such as the pulley 7 and V-belts 8, as shown in Figs. 1 and 2, or other suitable driving connections. In Figs. 5, 6 and 7, the same reference numerals are applied to parts which are the same as those before described. This latter modification of the invention facilitates interchange of one gearing for another when desired, as when it is desirable to vary the differential between the speeds of rotation of the shafts 1 and 34; and said modification also facilitates removal of any parts for replacement or for other purposes.

As shown, and as before described, the support for a part of said differential gear mechanism includes the hub 37 attached to the shaft 34 by the key 39 and having the integral radially extended web plate 38; a reduced lower end portion of the shaft 34 extends through said web plate 38 and is engaged by the removable and replaceable nut 39' which holds said gear support 37—38 rigidly on the shaft 34 and prevents relative displacement of said parts. When the nut 39' is removed, the unit comprising the gear support 37—38 and the parts carried thereby including the lower bearing 36, may be detached and removed from the shaft 34. The two stud shafts 40 are supported by the web plate 38 on axes parallel with each other and with the axes of the shafts 1 and 34, preferably in diametrically opposite positions; and the pinions 42 are attached to the upper ends of said shafts 40 and mesh preferably with diametrically opposite portions of the gear 33, as before described. I have found that a satisfactory operation is obtained in the type of machine disclosed by providing fifty-two teeth on the gear 33 and twelve teeth on each pinion 42; but it is evident that this relationship may be varied without departure from the principal and scope of either modification of the invention.

The controlling spiral gears 43 are attached to the lower ends of the respective stud shafts 40. The number of teeth on the spiral gears 43 in this modification of the invention may be the same as or different from the number of said teeth in the modification first described; and said teeth extend upwardly and downwardly at approximately uniform angles less than 30° from the planes of the axes of the shafts 40 to said respective teeth. That is, the spiral teeth on the gears 43 incline less than 30° from vertical planes as in the modification first described. The spiral gears 43 engage with complementary locking and actuating spiral worms 86 attached to two horizontal stud shafts 87. As in the preceding modification, the two stud shafts 87 extend in parallel planes and are rotatively journalled in bearings 88. The bearings 88 are not supported by the member 37—38 as in the first modification, but are supported by arms 89 extending downwardly from integral connection with a plate 90 removably attached to the web 38 by fasteners 91. The teeth of the spiral worms 86 are at angles of less than 30° from the planes of the axes of the shafts 87, and prevent rotation of the pinions 42 about their axes by the gear element 33. That is to say, the interengaging spiral gears 43 and worms 86 constitute locks preventing rotation of the pinions 42 about their axes by the gear 33, as do the interengaging spiral gears 43 and worms 44 in the preceding modification. In both modifications, mechanism is provided for rotating the stud shafts 40 and the pinions 42 about their respective axes by the worms 86 during and as an incident to their planetary movements. In this modification of the invention, said mechanism comprises a rigid stud 92 in axial alinement with the shaft 34 and having a rigid worm 93 meshing with spiral gears 94 secured on the inner ends of the shafts 87. The stud 92 is rigidly attached to a support 95 removably and rigidly secured to the bottom housing wall 65 by the removable and replaceable fasteners 66, as before described. The shaft 34 is prevented from applying torsional strains and stresses to any of the parts of the differential gearing by a bearing 96 mounted on the stud 92 and engaged by a member 97 detachably connected with the member 90 by removable and replaceable fasteners 98. In this form of the invention, the locking and actuating differential worms 86 may easily be interchanged for others by detaching the fastener 91 for the supporting member 90 and substituting another.

From the foregoing, it is evident that the differential speed of rotation or revolutions per minute of the inner shaft 34 with respect to the outer tubular drive shaft 1 may be varied as desired by changing the ratio of the gearing 33, 42, 43, 44, 49 and 48, in Figs. 2, 3 and 4, or by changing the ratio of the gearing 33, 42, 43, 86, 94 and 93 in Figs. 5, 6 and 7. This may be accomplished in either of the two ways disclosed. That is, by the substitution of differential gearing of different ratios for the gearings shown and specifically described, the differences in the revolutions per minute of the drive shaft and the shaft 34 may be optionally increased as desired, or as required to obtain best results in the uses to which the machines are to be applied. The invention is constructed to provide for this optional variation.

It is apparent that this invention attains all of its intended objects and purposes efficiently and satisfactorily. The differential gearing is durable, comparatively silent in operation, does not become worn or damaged to any serious extent by long usage, and interchange and substitution of parts may readily be made. The invention may be varied as widely as the scope of equivalent limits will permit without departure from the nature and principle thereof as defined by the appended claims.

I claim:

1. Mechanism of the character described comprising a rotary outer tubular shaft, connections for positively rotating said shaft, an inner shaft within and coaxial with said outer shaft and extending beyond one end thereof, a gear attached to said outer shaft for rotation thereby, a support attached to said inner shaft, a rotary pinion mounted on said support in permanent mesh with said gear, a spiral gear attached to said pinion, a worm carried by said support engaging said spiral gear and preventing rotation of said pinion by said first gear and leaving said pinion free for planetary movement by said first gear to rotate said inner shaft when said tubular shaft and said first gear are rotated as aforesaid, and spiral gearing for rotating said first spiral gear and thereby said pinion relative to said gear and thereby controlling rotation of said inner shaft differentially from said outer shaft.

2. Mechanism of the character described comprising a rotary outer tubular shaft, connections for positively rotating said shaft, an inner shaft within and coaxial with said outer shaft and extending beyond one end thereof, an annular gear attached to said outer shaft for rotation thereby, a support attached to said inner shaft, a rotary pinion mounted on said support in permanent mesh with said annular gear, a first spiral gear attached to said pinion, a worm carried by said support engaging said first spiral gear, a second spiral gear attached to said worm gear, and a second worm gear rigidly mounted to engage said second spiral gear to prevent rotation of said pinion on its axis but to cause the planetary rotation of said pinion to rotate said second shaft and thereby controlling rotation of said inner shaft differentially from said outer shaft when said tubular shaft is rotated as aforesaid.

3. A differential for centrifugal machines comprising a rotary tubular outer shaft, connections for rotating said outer shaft, an inner shaft within and coaxial with said outer shaft and extending beyond one end thereof, an annular gear attached to said outer shaft for rotation thereby, a support attached to said inner shaft, a rotary pinion mounted on said support in permanent mesh with said annular gear, a first spiral gear attached to said pinion, a worm engaging said first spiral gear and preventing rotation of said pinion by said annular gear and leaving said pinion free for planetary movement by said annular gear to rotate said inner shaft, a second spiral gear attached to said worm, an element detachably connected to said support for holding said second spiral gear and said worm whereby said second spiral gear and worm may be interchanged with a spiral gear and a worm having a different number of teeth, and a second worm gear rigidly mounted to engage said second spiral gear for controlling rotation of said inner shaft differently from said outer shaft when said tubular shaft is rotated as aforesaid.

4. A differential for centrifugal machines comprising a rotary tubular outer shaft, connections for rotating said outer shaft, an inner shaft within and coaxial with said outer shaft and extending beyond one end thereof, an annular gear attached to said outer shaft for rotation thereby, a support attached to said inner shaft, a rotary pinion mounted on said support in permanent mesh with said annular gear, a first spiral gear attached to said pinion, a worm engaging said first spiral gear and preventing rotation of said pinion by said annular gear and leaving said pinion free for planetary movement by said annular gear to rotate said inner shaft, a second spiral gear attached to said worm, an element detachably connected to said support for holding said second spiral gear and said worm whereby said second spiral gear and worm may be interchanged with a spiral gear and a worm having a different number of teeth, and a second worm gear for rotating said second spiral gear to control rotation of said inner shaft differentially from said outer shaft when said tubular shaft is rotated as aforesaid, the speed at which said second worm gear is rotated effecting a change in the differential speed of the inner shaft to said outer shaft.

5. Mechanism of the character described comprising a rotary outer tubular shaft, connections for positively rotating said shaft, an inner shaft within and coaxial with said outer shaft and extending beyond one end thereof, an annular gear attached to said outer shaft for rotation thereby, a support attached to said inner shaft, a rotary pinion mounted on said support in permanent mesh with said annular gear, a spiral gear attached to said pinion, a worm carried by said support engaging said spiral gear, means for preventing rotation of said pinion on its axis, and means operative with said rotation preventing means to cause planetary rotation by said pinion to rotate said inner shaft and thereby control the rotation of said inner shaft differentially from said outer shaft when said tubular shaft is rotated as aforesaid.

6. A differential for centrifugal machines comprising a rotary tubular outer shaft, connections for rotating said outer shaft, an inner shaft within and coaxial with said outer shaft and extending beyond one end thereof, an annular gear attached to said outer shaft for rotation thereby, a support attached to said inner shaft, a rotary pinion mounted on said support in permanent mesh with said annular gear, a spiral gear attached to said pinion, a worm engaging said spiral gear and preventing rotation of said pinion by said annular gear and leaving said pinion free for planetary movement by said first gear to rotate said inner shaft, a second spiral gear attached to said worm, and a third spiral gear rigidly mounted engaging said second spiral gear for controlling rotation of said inner shaft differentially from said outer shaft when said tubular shaft is rotated as aforesaid.

7. A differential for centrifugal machines comprising a rotary tubular outer shaft, connections for rotating said outer shaft, an inner shaft within and coaxial with said outer shaft and extending beyond one end thereof, an annular gear attached to said outer shaft for rotation thereby, a support attached to said inner shaft, a rotary pinion mounted on said support in permanent mesh with said annular gear, a spiral gear attached to said pinion, a worm engaging said spiral gear and preventing rotation of said pinion by said annular gear and leaving said pinion free for planetary movement by said first gear to rotate said inner shaft, a second spiral gear attached to said worm, and a third spiral gear for rotating said second spiral gear controlling rotation of said inner shaft differentially from said outer shaft when said tubular shaft is rotated as aforesaid, the speed at which said second spiral gear is rotated effecting a change in the differential speed of said inner shaft to said outer shaft.

ANDREW F. HOWE.

REFERENCES CITED

The following references are of record in the file of this patent:

UNITED STATES PATENTS

| Number | Name | Date |
|---|---|---|
| 1,564,318 | Bower | Dec. 8, 1925 |
| 1,882,383 | Hallitt | Oct. 11, 1932 |
| 1,962,461 | Piper | June 12, 1934 |
| 2,043,661 | Howe | June 9, 1936 |
| 2,219,857 | Weston | Oct. 29, 1940 |

FOREIGN PATENTS

| Number | Country | Date |
|---|---|---|
| 519,865 | France | Apr. 18, 1925 |